US012626288B2

(12) United States Patent
    Gudla et al.

(10) Patent No.: US 12,626,288 B2
(45) Date of Patent: May 12, 2026

(54) BOOSTING SCORES FOR RANKING ITEMS MATCHING A SEARCH QUERY

(71) Applicant: Maplebear Inc., San Francisco, CA (US)

(72) Inventors: Vinesh Reddy Gudla, South San Francisco, CA (US); Tyler Russell Tate, Lexington, KY (US); Tejaswi Tenneti, San Carlos, CA (US); Akshay Nair, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 414 days.

(21) Appl. No.: 17/955,250

(22) Filed: Sep. 28, 2022

(65) Prior Publication Data

US 2024/0104622 A1      Mar. 28, 2024

(51) Int. Cl.
    *G06Q 30/0601*      (2023.01)
    *G06Q 30/0201*      (2023.01)
    *G06Q 30/0204*      (2023.01)

(52) U.S. Cl.
    CPC ..... *G06Q 30/0629* (2013.01); *G06Q 30/0201* (2013.01); *G06Q 30/0204* (2013.01)

(58) Field of Classification Search
    CPC ........... G06Q 30/0629; G06Q 30/0201; G06Q 30/0204
    See application file for complete search history.

(56) References Cited

U.S. PATENT DOCUMENTS 9,904,949 B1 *   2/2018   Tavernier ........... G06Q 30/0631
    11,599,548 B2 *  3/2023   Lee ........................ G06N 20/00

2012/0066065 A1 *  3/2012   Switzer .............. G06Q 30/0255
                                                        705/1.1
    2014/0244423 A1 *  8/2014   Kessler .............. G06Q 30/0631
                                                        705/26.7
    2020/0134364 A1 *  4/2020   Kuruvilla .............. G06F 18/214
    2021/0117417 A1 *  4/2021   Hendrickson ........... G06F 16/90
    2021/0240722 A1 *  8/2021   Puthenputhussery ......................
                                                        G06F 16/24578

(Continued)

FOREIGN PATENT DOCUMENTS

WO      WO-2009137152 A1 *  11/2009   ............. G06Q 30/02

OTHER PUBLICATIONS

Solving Fashion Recommendation—The Farfetch Challenge (Year: 2021).*

(Continued)

*Primary Examiner* — Gautam Ubale
(74) *Attorney, Agent, or Firm* — Fenwick & West LLP

(57)      ABSTRACT

An online system receives a search query from a client device associated with a user and queries a database including item data for a set of items matching the query, in which the set of items is at a retailer location associated with a retailer type and each item is associated with an item category. For each item of the set, a machine learning model is applied to predict a probability of conversion for the user and item and a score is computed based on an expected value, in which the expected value is based on a value associated with the item and the probability. The score for each item is boosted based on the item category, retailer type, or a user segment that is based on the user's historical order data. The items are ranked based on the boosted scores and the ranking is sent to the client device.

17 Claims, 5 Drawing Sheets

(56)               References Cited

U.S. PATENT DOCUMENTS

| | | | |
|---|---|---|---|
| 2021/0295364 A1* | 9/2021 | Veettil | G06Q 30/0282 |
| 2022/0222294 A1* | 7/2022 | Wang | G06F 16/685 |
| 2022/0245162 A1* | 8/2022 | Wang | G06F 16/24578 |
| 2022/0245713 A1* | 8/2022 | Bathe | G06N 20/00 |
| 2023/0289868 A1* | 9/2023 | Bender | G06N 5/022 |

OTHER PUBLICATIONS

Comparing hundreds of machine learning and discrete choice models for travel demand modeling: an empirical benchmark (Year: 2021).*

* cited by examiner

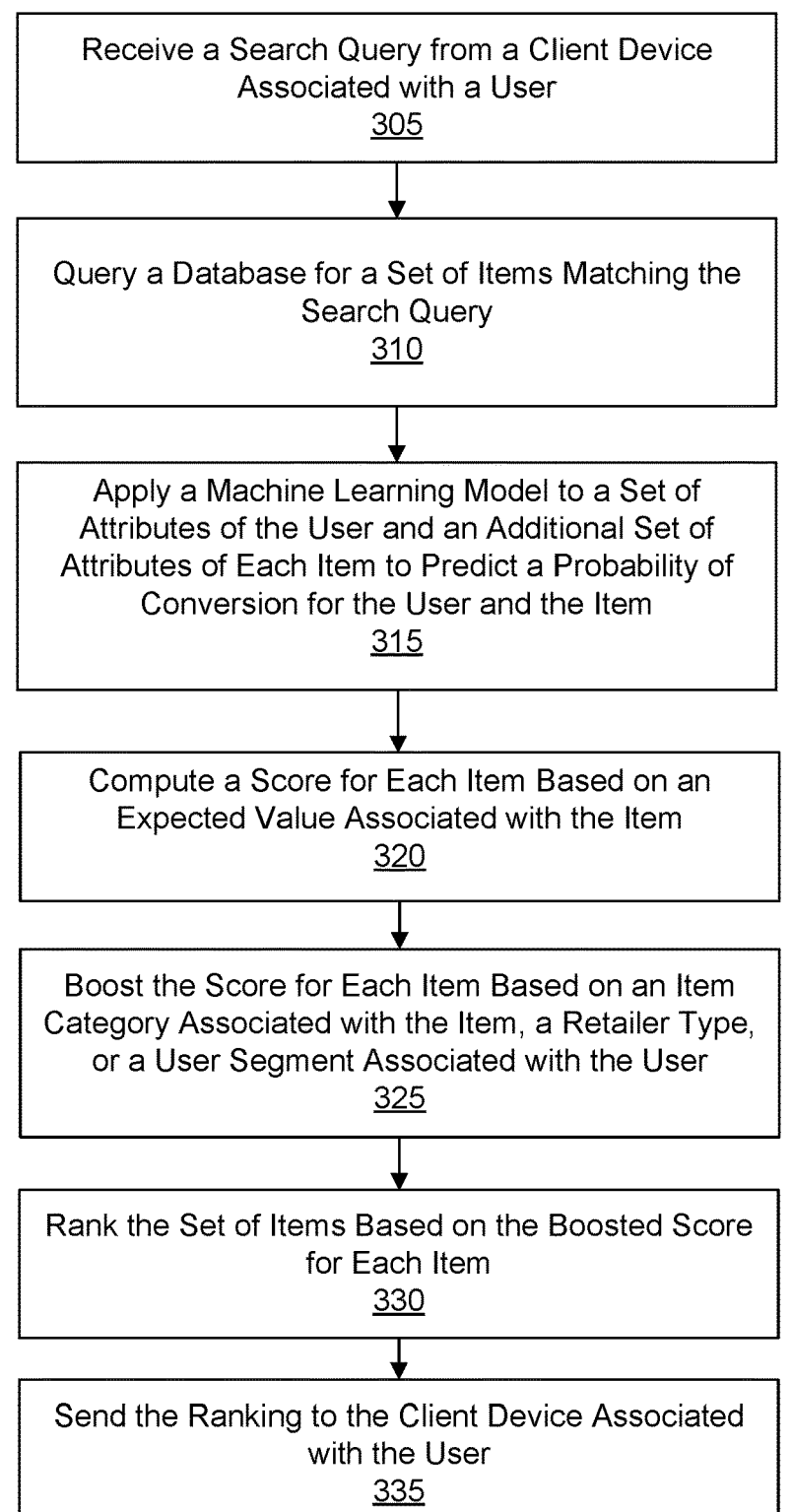

Receive a Search Query from a Client Device
Associated with a User
305

Query a Database for a Set of Items Matching the
Search Query
310

Apply a Machine Learning Model to a Set of
Attributes of the User and an Additional Set of
Attributes of Each Item to Predict a Probability of
Conversion for the User and the Item
315

Compute a Score for Each Item Based on an
Expected Value Associated with the Item
320

Boost the Score for Each Item Based on an Item
Category Associated with the Item, a Retailer Type,
or a User Segment Associated with the User
325

Rank the Set of Items Based on the Boosted Score
for Each Item
330

Send the Ranking to the Client Device Associated
with the User
335

FIG. 3

BOOSTING SCORES FOR RANKING ITEMS MATCHING A SEARCH QUERY

BACKGROUND

Online systems, such as online concierge systems and online retailers, may receive requests from their users to search for items available through the online systems in the form of search queries. In response, the online systems may return lists of search results matching the search queries. Items included in a list of results may be ordered based on their relevance to a search query, such that items that are more relevant appear in more prominent positions in the list of results than less relevant items. For example, if a user provides a search query with the words "chocolate chips" in an ordering interface provided by an online system, the online system may return a list of items ordered based on their relevance to the search query, (e.g., with chocolate chips at the top, followed by chocolate chip cookies, chocolate chip ice cream, etc.). Alternatively, since online systems may receive compensation that is proportional to values associated with items purchased by their users (e.g., in the form of commissions for online concierge systems), online systems may order items included in search results based on their values to maximize revenue. In the above example, the online system may order items based on their prices instead of their relevance, such that more expensive items appear higher in the list than less expensive items.

However, since items included in the most prominent positions of lists of search results that are ordered based on values associated with items may not be that relevant to users searching for the items, the users may become frustrated and purchase fewer items or even refrain from purchasing items altogether, reducing revenue earned by the online systems. In the above example, if the chocolate chips for which the user is searching are relatively inexpensive, several items that appear higher in the list than the chocolate chips (e.g., chocolate chip cakes, chocolate chip cookies, chocolate chip ice cream, chocolate chip brownies, etc.) may make it difficult for the user to find them among the list of results. Additionally, in the above example, if different brands of chocolate chips have very different prices such that they do not appear near each other in the search results, the user may refrain from purchasing the chocolate chips if they wanted to compare different brands of chocolate chips before purchasing them and their ordering within the list makes it difficult for the user to do so.

SUMMARY

In accordance with one or more aspects of the disclosure, an online system ranks items matching a search query based on an item category, a retailer type, or a user segment. More specifically, the online system receives a search query from a client device associated with a user of the online system and queries a database including item data for a set of items matching the search query, in which the set of items is included among an inventory of a retailer location associated with a retailer type and each of the set of items is associated with an item category. For each item included among the set of items, the online system applies a machine learning model to a set of attributes of the user and an additional set of attributes of the item to predict a probability of conversion for the user and the item and computes a score for the item based on an expected value associated with the item. The expected value associated with an item is based on a value (e.g., a price) associated with the item and the probability of conversion for the user and the item. The online system also boosts the score for each item based on the item category associated with the item, the retailer type, or a user segment associated with the user, in which the user segment is based on historical order data associated with the user. The online system then ranks the set of items based on the boosted scores and sends the ranking to a display area of the client device.

BRIEF DESCRIPTION OF THE DRAWINGS

FIG. 3 is a flowchart of a method for ranking items matching a search query based on an item category, a retailer type, or a user segment, in accordance with one or more embodiments.

DETAILED DESCRIPTION

Figure 1:
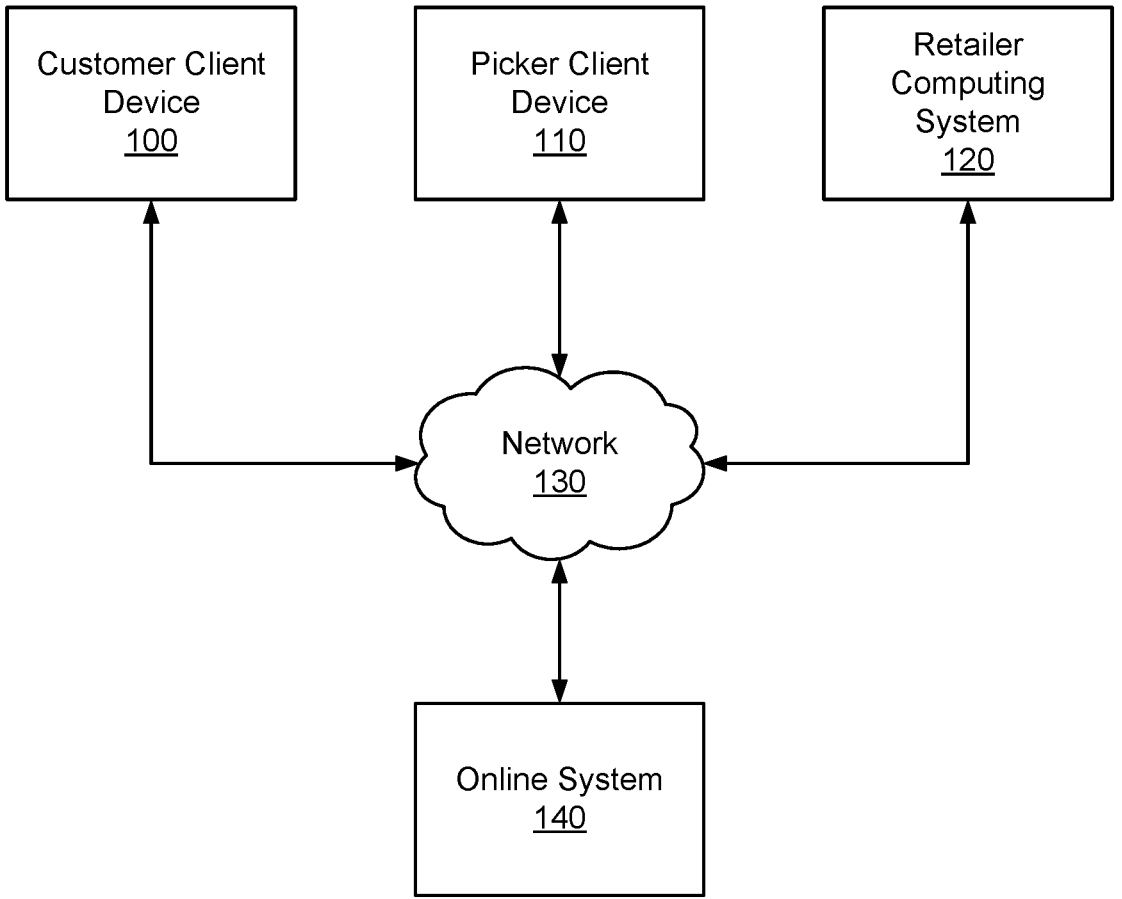
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, means a good or product that can be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
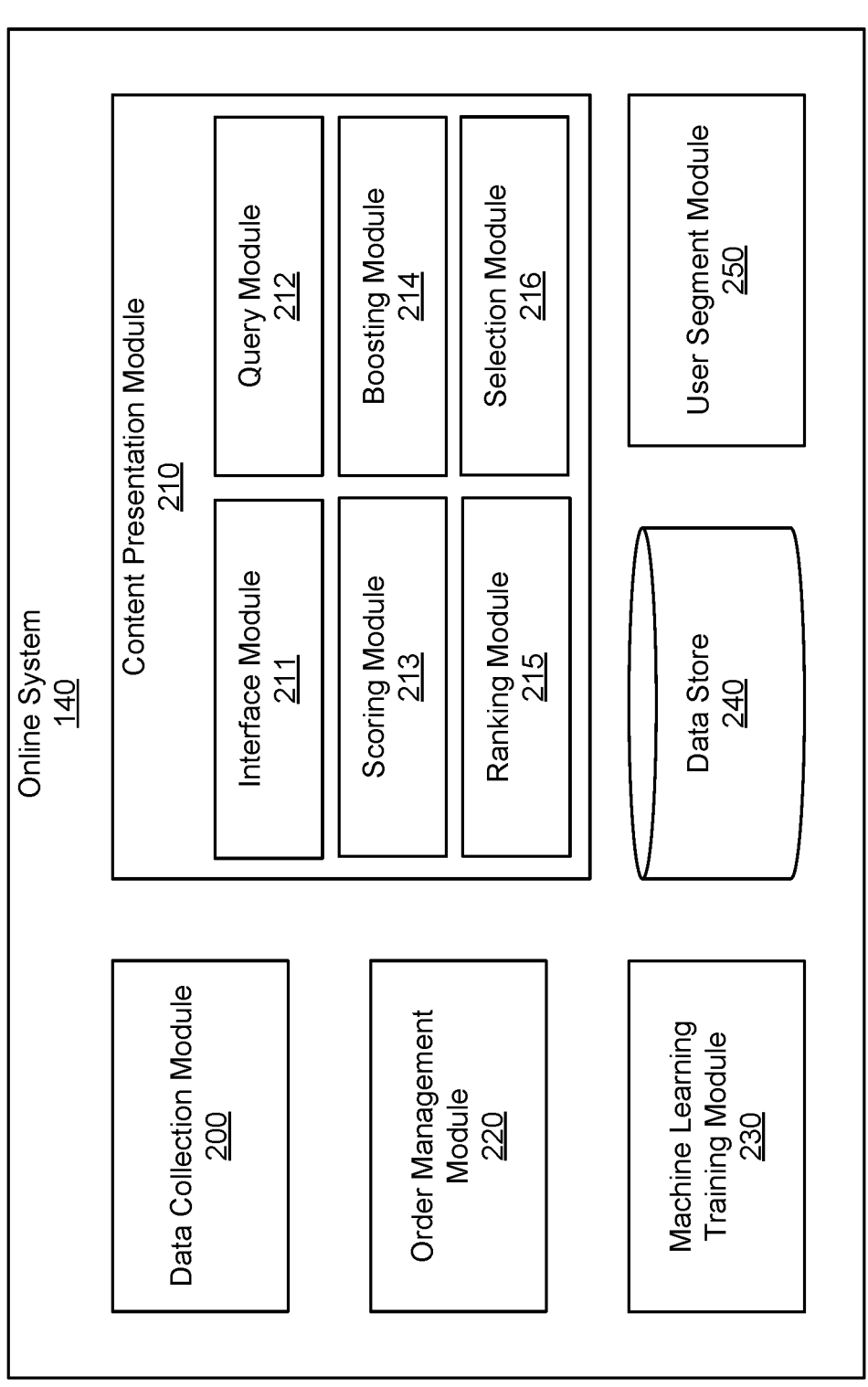
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, previous order history, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. In some embodiments, item data also may include various prices associated with items. For example, an item may be associated with a full price, a sale price, or a loyalty program price offered to members of a loyalty program for a retailer. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

Item data collected by the data collection module 200 identifying and describing items that are available at a retailer location also may include information describing the retailer location. For example, item data describing an item available at a retailer location may include a name of the retailer, an address of the retailer location, types of items included among the inventory of the retailer location, prices of items included among the inventory of the retailer location, membership or club requirements associated with the retailer location, sources of inventory for the retailer location, etc.

In some embodiments, information describing a retailer location may include a retailer type associated with the retailer location. Examples of retailer types include traditional grocery stores, organic grocery stores, convenience stores, warehouse club stores, specialty stores, department stores, discount stores, premium stores, outlet stores, or any other suitable types of retailers. In some embodiments, multiple retailer types may be associated with a retailer location. For example, a retailer location that sells high-end baking supplies may be associated with specialty store and premium store retailer types. A retailer type associated with a retailer location may be specified by the retailer or determined by the data collection module 200 based on information describing the retailer location. In some embodiments, the data collection module 200 may determine a retailer type associated with a retailer location using a retailer type model. A retailer type model is a machine learning model trained by the machine learning training module 230 to predict a retailer type associated with a retailer location based on labels indicating retailer types associated with retailer locations and various attributes of the retailer locations. For example, the data collection module 200 may apply the retailer type model to attributes of a retailer location, such as information describing types of items included among the inventory of the retailer location, prices of items included among the inventory of the retailer location, etc. to predict one or more retailer types associated with the retailer location.

An item category is a set of items that are a similar type of item. Items in an item category may be considered to be equivalent to each other or that may be replacements for each other in an order. For example, different brands of sourdough bread may be different items, but these items may be in a "sourdough bread" item category. In some embodiments, item categories may be broader in that the same item category may include a wide variety of items that are related to a common theme, found in the same department, etc., but may not be considered equivalent to each other or may not be replacements for each other in an order. For example, toothpaste and shampoo may both be included in a "personal care" item category, but are not considered equivalent to each other and cannot be replacements for each other in an order. Examples of these item categories include groceries, alcohol, tobacco, pharmaceuticals, gifts, clothing, accessories, personal care, books, electronics, furniture, houseware, toys, sporting goods, pet supplies, baby supplies, arts and crafts supplies, office supplies, party supplies, cleaning supplies, home improvement, appliances, etc. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. Components of the content presentation module 210 include an interface module 211, a query module 212, a scoring module 213, a boosting module 214, a ranking module 215, and a selection module 216. The interface module 211 generates and transmits the ordering interface for the customer to order items. The interface module 211 also populates the ordering interface with items that the customer may select for adding to their order. In some embodiments, the interface module 211 presents a catalog of all items that are available to the customer, which the customer can browse to select items to order. The content presentation module 210 also may identify items that the customer is most likely to order and present those items to the customer. For example, the scoring module 213 may score items and the ranking module 215 may rank the items based on their scores. The interface module 211 displays the items selected by the selection module 216 with scores that exceed some threshold (e.g., the top n items or the p percentile of items).

The scoring module 213 may use an item selection model to score items for presentation to a customer. An item selection model is a machine learning model that is trained to score items for a customer based on item data for the items and customer data for the customer. In some embodiments, the score for an item corresponds to a predicted probability of conversion for the customer and the item. For example, the item selection model may be trained to determine a likelihood that the customer will order the item. In such embodiments, the scoring module 213 may apply the item selection model to a set of attributes of the customer (e.g., included among the customer data stored in the data store 240) and an additional set of attributes of the item (e.g., included among the item data stored in the data store 240) to predict a probability of conversion for the customer and the item. In some embodiments, the item selection model uses item embeddings describing items and customer embeddings describing customers to score items. These item embeddings and customer embeddings may be generated by separate machine learning models and may be stored in the data store 240. In various embodiments, the item selection model may be a regression model trained by the machine learning training module 230 based on historical order data associated with one or more customers.

In some embodiments, the scoring module 213 scores items based on a search query received from the customer client device 100 (e.g., via the ordering interface generated and transmitted by the interface module 211). A search query is text for a word or set of words that indicate items of interest to the customer. In some embodiments, the query module 212 may query a database including item data stored in the data store 240 for a set of items that match at least a portion of the search query. In such embodiments, the scoring module 213 may then score items based on a relatedness of the items to the search query (e.g., as embedding scores, as further described below). For example, the query module 212 may apply natural language processing (NLP) techniques to the text in the search query to generate a search query representation (e.g., a search query embedding) that represents characteristics of the search query. In this example, the query module 212 may compare the search query representation to an item representation (e.g., an item embedding) and identify items that match at least a portion of the search query based on the comparison. Continuing with this example, the scoring module 213 may then determine a score (e.g., an embedding score) for each item based on the comparison, in which the score indicates a relevance of the item to the search query.

In some embodiments, the scoring module 213 scores items based on a predicted availability of an item. The scoring module 213 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The selection module 216 may weight the score for an item based on the predicted availability of the item. Alternatively, the selection module 216 may filter out items from presentation to a customer based on whether the predicted availability of the item exceeds a threshold.

In some embodiments, the scoring module 213 also may compute scores for items based on expected values associated with the items. An expected value associated with an item may be based on a value associated with the item (e.g., a function of a price of the item) and a probability of conversion for a customer and the item. For example, the scoring module 213 may compute scores for items equal to their expected values, in which an expected value associated with an item corresponds to a product of a probability a customer will purchase the item and a minimum of a sale price, a loyalty program price, and a full price for the item. In embodiments in which the scoring module 213 scores items based on a search query received from a customer client device 100, a value associated with an item may account for a relevance of the item to the search query. For example, suppose that the query module 212 applies natural language processing (NLP) techniques to text in a search query to generate a search query embedding that represents characteristics of the search query and compares the search query embedding to each item embedding corresponding to an item. In this example, suppose also that the scoring module 213 determines an embedding score for each item based on the comparison (e.g., based on a cosine similarity, a Euclidean distance, or any other similarity measure), such that the embedding score for a candidate item is proportional to a measure of similarity between its corresponding item embedding and the search query embedding. Continuing with this example, the scoring module 213 may compute a score for each candidate item equal to its expected value, in which the expected value is computed based on a product of a probability the customer will purchase the item and a function of a price of the item. In the above example, the function of the price of the item may be computed based on a product of the embedding score and a minimum of a sale price, a loyalty program price, and a full price for the item.

The boosting module 214 may boost a score for an item computed by the scoring module 213. The boosting module 214 may boost the score for an item using one or more boosting variables. In embodiments in which the score for an item is computed by the scoring module 213 based on an expected value associated with the item, which in turn is based on a value associated with the item and a probability of conversion for a customer and the item, a boosting variable may change the value associated with the item. For example, a boosting variable may correspond to a coefficient or an exponent that is included in a function of the price of the item. In this example, the function of the price of the item used to compute its score may be an expression including the boosting variable, a measure of relevance of the item to a search query (e.g., an embedding score), and a price associated with the item.

The boosting module 214 may boost a score for an item based on an item category associated with the item, a retailer type, a user segment associated with a customer to whom the item may be presented, or any other suitable factor. For example, scores for items belonging to certain item categories (e.g., alcohol) that are associated with a high average price that customers are likely to pay may be boosted by a higher boosting variable than scores for items belonging to item categories (e.g., groceries) that are associated with a low average price that customers are likely to pay. As an additional example, scores for items included among an inventory of a retailer location associated with a retailer type corresponding to a premium store may be boosted by a higher boosting variable than scores for items included among an inventory of a retailer location associated with a retailer type corresponding to a discount store. As yet another example, suppose that customers belonging to a value-oriented user segment are more inclined to purchase items that provide them more value (e.g., more volume or quantity) for their money and may only purchase premium items (e.g., items of a higher quality, of a certain brand, etc. that are relatively more expensive than other items) when they are on sale. In this example, suppose also that customers in a premium user segment are more inclined to purchase premium items regardless of price. Continuing with this example, scores for premium items to be presented to customers in the value-oriented user segment may be boosted by a lower boosting variable if they are full-priced than if they are on sale. Similarly, in this example, scores for premium items to be presented to customers in the premium user segment may be boosted by a higher boosting variable than the scores for non-premium items. In some embodiments, the boosting module 214 also or alternatively may decrease a score for an item computed by the scoring module 213. In the above example, scores for premium items to be presented to customers belonging to the value-oriented user segment may be decreased by a greater amount if they are full-priced than if they are on sale.

In some embodiments, the boosting module 214 may determine one or more boosting variables based on historical order data describing orders received from customers. In such embodiments, the boosting module 214 may plot data points based on the historical order data associated with the customers and determine the boosting variable(s) based on the data points. For example, to determine a boosting variable for boosting a score for an item based on an item category associated with the item, the boosting module 214 may plot the prices of items associated with different item categories purchased by customers to determine an average price customers were willing to pay for items associated with each item category. In this example, based on the average price for each item category, the boosting module 214 may determine a boosting variable for the item category that is proportional to the average price. In the above example, the boosting module 214 also may plot the prices of items included in orders associated with different retailer types placed by customers, determine an average price customers were willing to pay for items included in orders associated with each retailer type, and determine an additional boosting variable for each retailer type that is proportional to the average price for the retailer type. Continuing with the above example, the boosting module 214 also may plot the prices of items included in orders placed by customers associated with different user segments and determine an average price the customers associated with each user segment were willing to pay for items. In this example, the boosting module 214 may then determine yet another boosting variable for each user segment that is proportional to the average price for the user segment.

In various embodiments, the boosting module 214 may determine a boosting variable based on a set of parameters for a trained machine learning model. In embodiments in which the machine learning training module 230 trains a machine learning model (e.g., the item selection model) to predict a probability of conversion for a customer and an item, the boosting module 214 may determine one or more boosting variables based on one or more parameters that the model uses to process an input. For example, if the item selection model applies a weight to an input variable corresponding to a retailer type, the boosting module 214 may determine a boosting variable for the retailer type that corresponds to the weight. In the above example, the boosting module 214 similarly may determine a boosting variable for an item type or a user segment based on a weight the item selection model applies to an input variable corresponding to the item type or the user segment, respectively. In some embodiments, the boosting module 214 also or alternatively may determine a boosting variable based on live order data. For example, once the item selection model has been trained, the boosting module 214 may determine a boosting variable by executing a hyperparameter search, in which the boosting variable is a hyperparameter used by the item selection model. In this example, the hyperparameter search may be executed by trying different boosting variables (e.g., in a grid search) and determining which boosting variable performs the best with live order data. In the above example, the boosting module 214 may perform the hyperparameter search for boosting variables to be used to boost scores for various item categories, retailer types, or user segments.

In embodiments in which the boosting module 214 boosts scores for items for presentation to a customer, the ranking module 215 may rank the items based on their boosted scores and the interface module 211 may then send the ranking to a display area of a customer client device 100 associated with the customer. For example, the ranking module 215 may rank items based on their boosted scores, such that items having higher boosted scores are ranked higher than items having lower boosted scores. In this example, the interface module 211 then sends the ranking to a display area of a customer client device 100 from which a search query was received. In some embodiments, the selection module 216 may select a set of items and the interface module 211 may then send the selected items to the display area of the customer client device 100 associated with the customer. In the above example, the selection module 216 may select items with boosted scores or ranks that exceed some threshold (e.g., the top n items or the p percentile of items).

The order management module 220 manages orders for items from customers. The order management module 220 receives orders from a customer client device 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

In some embodiments, the user segment module 250 determines a user segment associated with a customer. A user segment associated with a customer may indicate a behavior (e.g., a purchasing behavior, a browsing behavior, etc.) associated with the customer. For example, customers included in a value-oriented user segment may be more inclined to purchase items that provide more value for their money and may only purchase premium items when they are on sale, while customers in a premium user segment may be more inclined to purchase premium items regardless of price. The user segment module 250 may determine a user segment associated with a customer based on various features associated with the customer included among the customer data. These features may be associated with orders received from the customer, such as an average total amount spent on each order, an average percentage of discounted items included in each order, an average amount spent on each item included in each order, an average number of items associated with at least a threshold price included in each order, an average number of items associated with less than a threshold price included in each order, an average number of organic items included in each order, a frequency with which the customer placed orders, one or more retailer types associated with the orders, etc. In various embodiments, the user segment module 250 may determine a user segment associated with a customer using an algorithm (e.g., k-means clustering) that classifies the customer into a user segment. For example, the user segment module 250 may generate data points associated with different customers, in which each data point for a customer is generated based on one or more features associated with the corresponding customer. In this example, the user segment module 250 may then classify each data point into a user segment based on a clustering algorithm and determine a user segment associated with each customer based on a classification of a data point associated with the customer.

Boosting Scores for Ranking Items Matching a Search Query Based on an Item Category, a Retailer Type, or a User Segment FIG. 3 is a flowchart for a method for ranking items matching a search query based on an item category, a retailer type, or a user segment, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system without human intervention.

Figure 4A:
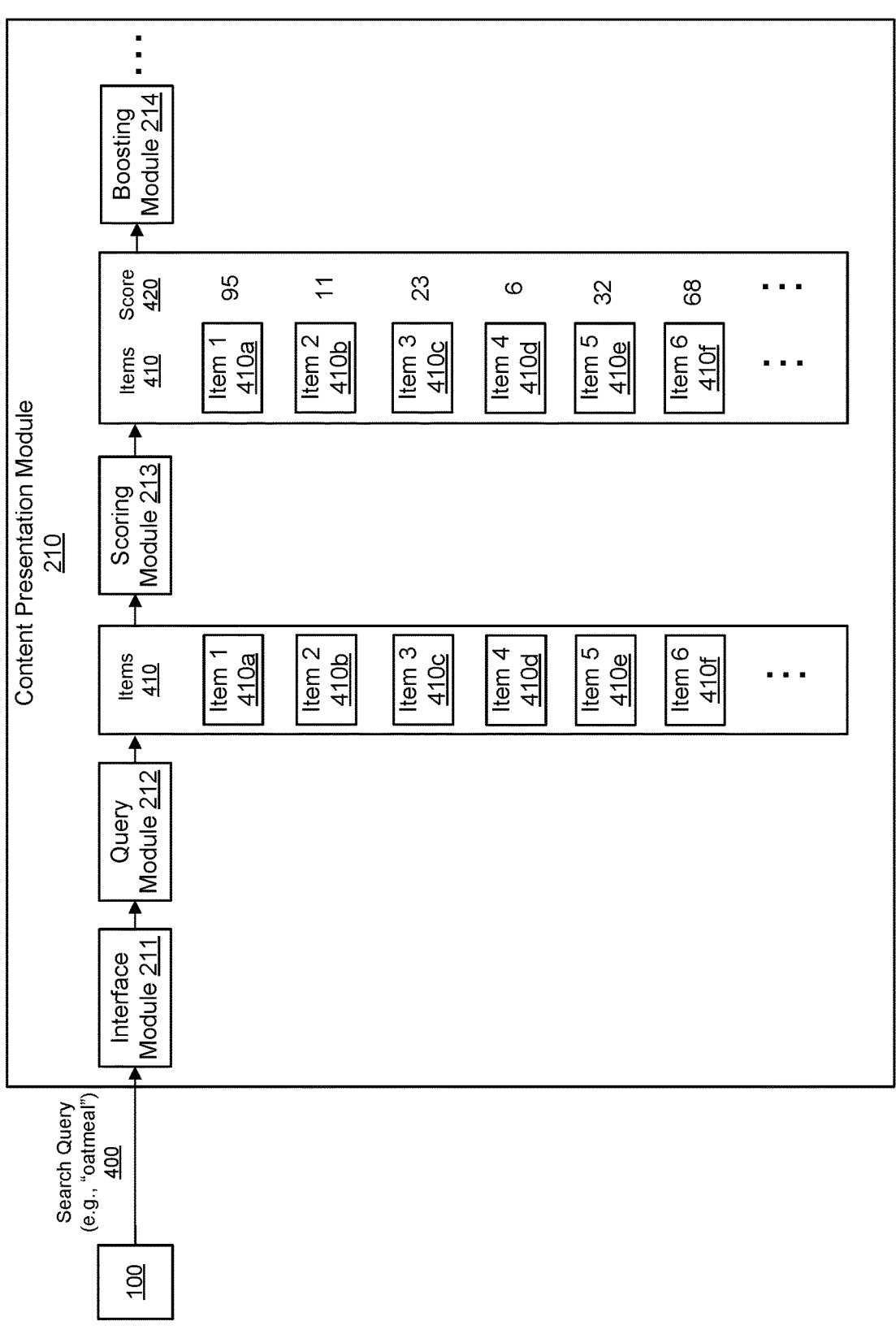
FIGS. 4A and 4B illustrate a conceptual diagram of a method for ranking items matching a search query based on an item category, a retailer type, or a user segment, in accordance with one or more embodiments.

The online system 140 receives 305 (e.g., via the interface module 211) a search query from a client device associated with a user of the online system 140. The online system 140 may receive 305 the search query via an ordering interface generated and transmitted by the online system 140 (e.g., via the interface module 211). The search query may include text, such as a set of words that indicate items of interest to the user. For example, as shown in FIG. 4A, which illustrates a conceptual diagram of a method for ranking items matching a search query based on an item category, a retailer type, or a user segment, in accordance with one or more embodiments, the online system 140 receives 305 the search query 400 from a customer client device 100 associated with a customer. In this example, the search query 400 may include the word "oatmeal" to identify items of interest to the customer corresponding to oatmeal food items.

Referring back to FIG. 3, the online system 140 then queries 310 (e.g., using the query module 212) a database (e.g., in the data store 240) including item data for a set of items that match at least a portion of the search query 400. For example, the online system 140 may apply natural language processing (NLP) techniques to the text in the search query 400 to generate a search query representation (e.g., a search query embedding) that represents characteristics of the search query 400. In this example, the online system 140 may compare the search query representation to an item representation (e.g., an item embedding) and identify items that match at least a portion of the search query 400 based on the comparison. As shown in the example of FIG. 4A, multiple items 410 may be included among the set of items 410 that match at least a portion of the search query 400. In this example, the items 410 may include different types of oatmeal food items (e.g., rolled oats, old fashioned oatmeal, steel cut oatmeal, flavored oatmeal, etc.), other food items that contain oatmeal (e.g., oatmeal granola bars, oatmeal cookies, etc.), and other types of items related to oatmeal (e.g., oatmeal soaps or shampoos).

The set of items 410 that match at least a portion of the search query 400 may be included among an inventory of a retailer location and the retailer location may be associated with a retailer type. A retailer type associated with the retailer location may be included among item information associated with each of the set of items. Examples of retailer types include traditional grocery stores, organic grocery stores, convenience stores, warehouse club stores, specialty stores, department stores, discount stores, premium stores, outlet stores, or any other suitable types of retailers. In some embodiments, multiple retailer types may be associated with the retailer location. For example, if the retailer location sells high-end baking supplies, the retailer location may be associated with specialty store and premium store retailer types. A retailer type associated with the retailer location may be specified by the retailer or determined by the online system 140 (e.g., using the data collection module 200) based on information describing the retailer location. In some embodiments, the online system 140 may determine the retailer type associated with the retailer location using a machine learning model (e.g., a retailer type model) trained by the online system 140 (e.g., using the machine learning training module 230) to predict a retailer type associated with a retailer location. In such embodiments, the machine learning model may be trained based on labels indicating retailer types associated with retailer locations and various attributes of the retailer locations. For example, the online system 140 may apply the machine learning model to attributes of the retailer location, such as information describing types of items 410 included among the inventory of the retailer location, prices of items 410 included among the inventory of the retailer location, etc. to predict one or more retailer types associated with the retailer location.

Furthermore, each item 410 included among the set of items 410 that match at least a portion of the search query 400 may be associated with an item category. An item category is a set of items 410 that are a similar type of item 410. In various embodiments, items 410 in an item category may be considered to be equivalent to each other or that may be replacements for each other in an order. For example, different brands of vanilla ice cream may be different items 410, but these items 410 may be in a "vanilla ice cream" item category. In some embodiments, item categories may be broader in that the same item category may include a wide variety of items 410 that are related to a common theme, found in the same department, etc., but may not be considered equivalent to each other or may not be replacements for each other in an order. For example, wine and beer may both be included in an "alcohol" item category, but are not considered equivalent to each other and cannot be replacements for each other in an order. Examples of these item categories include groceries, alcohol, tobacco, pharmaceuticals, gifts, clothing, accessories, personal care, books, electronics, furniture, houseware, toys, sporting goods, pet supplies, baby supplies, arts and crafts supplies, office supplies, party supplies, cleaning supplies, home improvement, appliances, etc. Item categories may be human-generated and human-populated with items 410 or generated automatically by the online system 140 (e.g., using a clustering algorithm).

Referring again to FIG. 3, for each item 410 included among the set of items 410 that match at least a portion of the search query 400, the online system 140 applies 315 (e.g., using the scoring module 213) a machine learning model (e.g., the item selection model) to a set of attributes of the user and an additional set of attributes of the item 410 to predict a probability of conversion for the user and the item 410. For example, the machine learning model may be trained to determine a likelihood that the user will order an item 410. In some embodiments, the machine learning model uses item embeddings describing the set of items 410 and user embeddings describing the user to predict the probability of conversion for the user for each of the set of items 410. These item embeddings and user embeddings may be generated by separate machine learning models and stored in the online system 140 (e.g., in the data store 240). In various embodiments, the machine learning model may be a regression model trained by the online system 140 (e.g., using the machine learning training module 230) based on historical order data associated with the user.

The online system 140 also computes 320 (e.g., using the scoring module 213) a score for each item 410 included among the set of items 410. In some embodiments, the online system 140 computes 320 the score based on an expected value associated with each item 410. An expected value associated with an item 410 may be based on a value associated with the item 410 (e.g., a function of a price of the item 410) and the probability of conversion for the user and the item 410. For example, the online system 140 may compute 320 a score for each item 410 equal to its expected value, in which the expected value associated with an item 410 corresponds to a product of the probability the user will purchase the item 410 and a minimum of a sale price, a loyalty program price, and a full price for the item 410. FIG. 4A shows examples of scores 420 computed 320 for the set of items 410. In some embodiments, the value associated with an item 410 may account for a relevance of the item 410 to the search query 400. For example, suppose that the online system 140 generates a search query embedding representing characteristics of the search query 400, compares the search query embedding to an item embedding corresponding to each item 410, and determines (e.g., using the scoring module 213) an embedding score for each item 410 based on the comparison (e.g., based on a cosine similarity, a Euclidean distance, or any other similarity measure). In this example, suppose also that the embedding score for each item 410 is proportional to a measure of similarity between its corresponding item embedding and the search query embedding and indicates a relevance of the item 410 to the search query 400. Continuing with this example, the online system 140 may compute 320 a score

420 for each item 410 equal to its expected value, in which the expected value is computed based on a product of a probability the user will purchase the item 410 and a function of a price of the item 410. In the above example, the function of the price of the item 410 may be computed based on a product of the embedding score and a minimum of a sale price, a loyalty program price, and a full price for the item 410.

The online system 140 also may compute 320 the score 420 for each item 410 included among the set of items 410 in other ways. In some embodiments, the score 420 for each item 410 also may be computed 320 based on a predicted availability of the item 410, a popularity of the item 410, or any other suitable factor or combination of factors. For example, the score 420 for each item 410 also may be computed 320 based on a predicted availability of the item 410 (e.g., such that the score 420 for an item 410 may be weighted based on a predicted availability of the item 410 or the item 410 may be filtered out for presentation to the user based on whether its predicted availability exceeds a threshold). As an additional example, the score 420 for each item 410 also may be computed 320 based on a popularity of the item 410, such that items 410 that are more popular are associated with higher scores 420 than items 410 that are less popular.

Figure 4B:
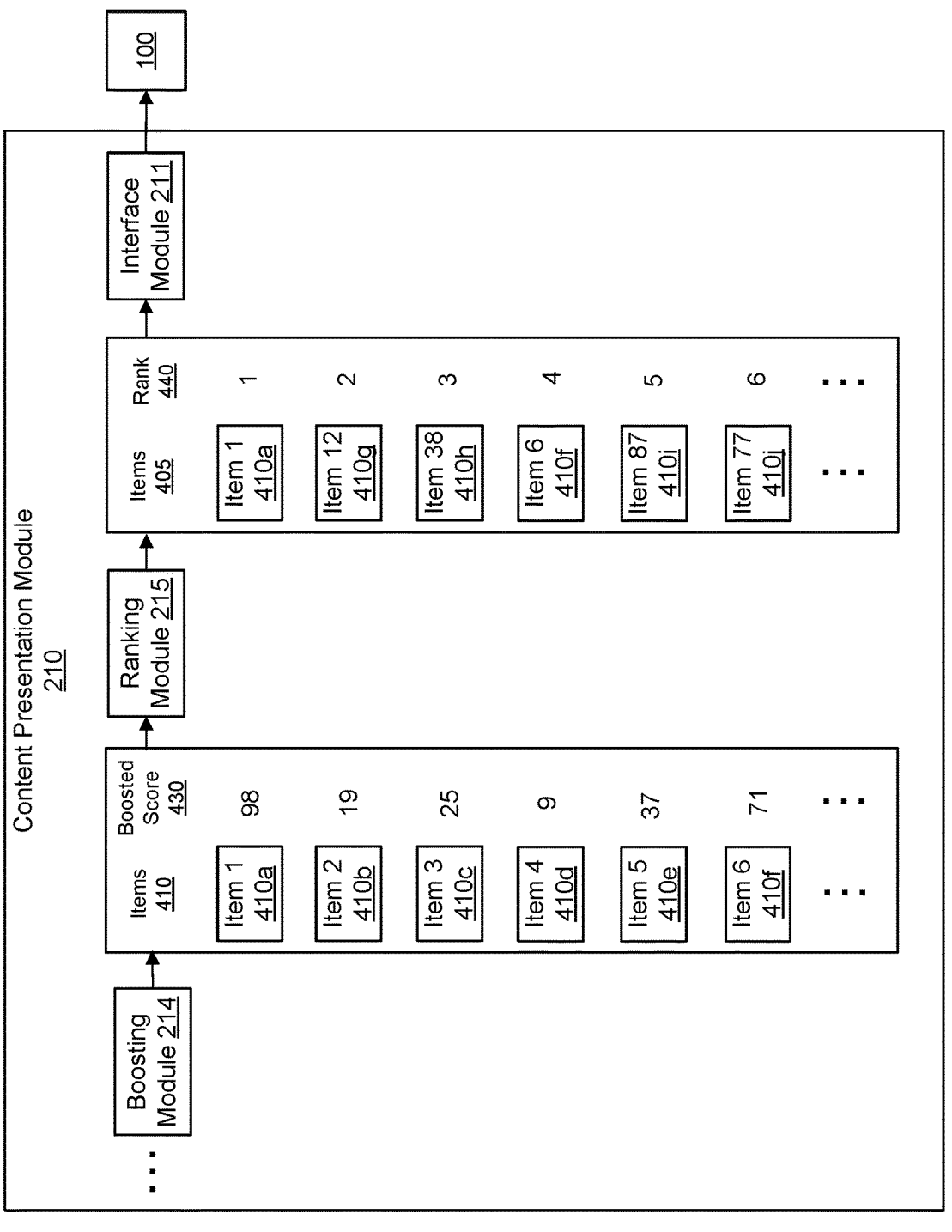

Referring back to FIG. 3, the online system 140 boosts 325 (e.g., using the boosting module 214) the score 420 for each item 410 included among the set of items 410. The online system 140 may boost 325 the score 420 for an item 410 using one or more boosting variables. In embodiments in which the score 420 for an item 410 is computed 320 by the online system 140 based on an expected value associated with the item 410, which in turn is based on a value associated with the item 410 and a probability of conversion for the user and the item 410, a boosting variable may change the value associated with the item 410. For example, as shown in FIG. 4B, which continues the example described above in conjunction with FIG. 4A, a boosting variable may correspond to a coefficient or an exponent that is a positive value included in a function of the price of the item 410, such that the boosted score 430 for each item 410 is higher than the score 420 computed 320 for the corresponding item 410. In this example, the function of the price of the item 410 used to compute 320 its score 420 may be an expression including the boosting variable, a measure of relevance of the item 410 to the search query 400 (e.g., an embedding score), and a price associated with the item 410.

The online system 140 may boost 325 the score 420 for an item 410 based on an item category associated with the item 410, the retailer type associated with the retailer location, a user segment associated with the user, or any other suitable factor. For example, scores 420 for items 410 belonging to certain item categories (e.g., alcohol) that are associated with a high average price that customers are likely to pay may be boosted 325 by a higher boosting variable than scores 420 for items 410 belonging to item categories (e.g., groceries) that are associated with a low average threshold price that customers are likely to pay. As an additional example, if the retailer location is associated with a premium store retailer type, scores 420 for the items 410 may be boosted 325 by a higher boosting variable than they would be if the retailer location were associated with a discount store retailer type. As yet another example, suppose that customers belonging to a value-oriented user segment are more inclined to purchase items 410 that provide more value (e.g., more volume or quantity) for their money and may only purchase premium items 410 (e.g., items 410 of a higher quality, of a certain brand, etc. that are relatively more expensive that other items) when they are on sale. In this example, suppose also that customers in a premium user segment are more inclined to purchase premium items 410 regardless of price. Continuing with this example, if the user is in the value-oriented user segment, scores 420 for premium items 410 to be presented to the user may be boosted 325 by a lower boosting variable if the items 410 are full-priced than if they are on sale. Similarly, in this example, if the user is in the premium user segment, the scores 420 for premium items 410 may be boosted 325 by a higher boosting variable than the scores 420 for non-premium items 410. In some embodiments, the online system 140 also or alternatively may decrease a score 420 for an item 410 computed 320 by the online system 140. In the above example, scores 420 for premium items 410 may be decreased by a greater amount if they are full-priced than if they are on sale if the user is in the value-oriented user segment.

In some embodiments, the online system 140 may determine (e.g., using the boosting module 214) one or more boosting variables based on historical order data describing orders received from customers. In such embodiments, the online system 140 may plot data points based on the historical order data associated with the customers and determine the boosting variable(s) based on the data points. For example, to determine a boosting variable for boosting a score 420 for an item 410 based on an item category associated with the item 410, the online system 140 may plot the prices of items 410 associated with different item categories purchased by customers to determine an average price customers were willing to pay for items 410 associated with each item category. In this example, based on the average price for each item category, the online system 140 may determine a boosting variable for the item category that is proportional to the average price. In the above example, the online system 140 also may plot the prices of items 410 included in orders associated with different retailer types placed by customers, determine an average price customers were willing to pay for items 410 included in orders associated with each retailer type, and determine an additional boosting variable for each retailer type that is proportional to the average price for the retailer type. Continuing with the above example, the online system 140 also may plot the prices of items 410 included in orders placed by customers associated with different user segments and determine an average price the customers associated with each user segment were willing to pay for items 410. In this example, the online system 140 may then determine yet another boosting variable for each user segment that is proportional to the average price for the user segment.

In various embodiments, the online system 140 may determine a boosting variable based on a set of parameters for a trained machine learning model. In embodiments in which the online system 140 trains a machine learning model (e.g., the item selection model) to predict a probability of conversion for the user and an item 410, the online system 140 may determine one or more boosting variables based on one or more parameters that the model uses to process an input. For example, if the item selection model applies a weight to an input variable corresponding to a retailer type, the online system 140 may determine a boosting variable for the retailer type that corresponds to the weight. In the above example, the online system 140 similarly may determine a boosting variable for an item type or a user segment based on a weight the item selection model applies to an input variable corresponding to the item type or the user segment, respectively. In some embodiments, the online system 140 also or alternatively may determine a boosting variable based on live order data. For example, once the item selection model has been trained, the online system 140 may determine a boosting variable by executing a hyperparameter search, in which the boosting variable is a hyperparameter used by the item selection model. In this example, the hyperparameter search may be executed by trying different boosting variables (e.g., in a grid search) and determining which boosting variable performs the best with live order data. In the above example, the online system 140 may perform the hyperparameter search for boosting variables to be used to boost (step 325) scores 420 for various item categories, retailer types, or user segments.

In some embodiments, the online system 140 determines (e.g., using the user segment module 250) a user segment associated with the user. A user segment associated with the user may indicate a behavior (e.g., a purchasing behavior, a browsing behavior, etc.) associated with the user. For example, customers included in a value-oriented user segment may be more inclined to purchase items 410 that provide more value for their money and may only purchase premium items 410 when they are on sale, while customers in a premium user segment may be more inclined to purchase premium items 410 regardless of price. The online system 140 may determine a user segment associated with the user based on various features associated with the user (e.g., included among the customer data in the data store 240). These features may be associated with orders received from the user, such as an average total amount spent on each order, an average percentage of discounted items 410 included in each order, an average amount spent on each item 410 included in each order, an average number of items 410 associated with at least a threshold price included in each order, an average number of items 410 associated with less than a threshold price included in each order, an average number of organic items 410 included in each order, a frequency with which the user placed orders, one or more retailer types associated with the orders, etc. In various embodiments, the online system 140 may determine a user segment associated with the user using an algorithm (e.g., k-means clustering) that classifies the user into a user segment. For example, the online system 140 may generate data points associated with different customers, in which each data point for a customer is generated based on one or more features associated with the corresponding customer. In this example, the online system 140 may then classify each data point into a user segment based on a clustering algorithm and determine a user segment associated with each customer based on a classification of a data point associated with the customer.

Referring once more to FIG. 3, the online system 140 then ranks 330 (e.g., using the ranking module 215) the set of items 410 and sends 335 (e.g., using the interface module 211) the ranking to a display area of the client device associated with the user. In embodiments in which the online system 140 boosts 325 the score 420 for each item 410, the online system 140 may rank 330 the set of items 410 based on their boosted scores 430. For example, as shown in FIG. 4B, the online system 140 may rank 330 the set of items 410 based on their boosted scores 430, such that items 410 having higher boosted scores 430 have higher ranks 440 than items 410 having lower boosted scores 430. In this example, the online system 140 then sends 335 the ranking to a display area of the customer client device 100 from which the search query 400 was received 305. In some embodiments, the online system 140 may select (e.g., using the selection module 216) one or more of the set of items 410 and the online system 140 may then send 335 the selected items 410 to the display area of the client device associated with the user. In the above example, the online system 140 may select items 410 with boosted scores 430 or ranks 440 that exceed some threshold (e.g., the top n items 410 or the p percentile of items 410).

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

at a computer system comprising a processor and a computer-readable medium:

receiving a search query from a client device associated with a user of an online system;

querying a database comprising item data for a set of items that match at least a portion of the search query, wherein each item of the set of items is associated with an item category;

for each item of the set of items:

computing an initial score for a corresponding item by applying a first machine learning model to a set of attributes of the user and an additional set of attributes of a corresponding item to predict a probability of the user interacting with the corresponding item through a user interface of the client device, wherein the first machine model comprises a neural network;

training a second machine learning model for the item of the corresponding items, wherein the second machine learning model comprises a regression model, wherein the second machine learning model is trained to predict the probability of the user interacting with the corresponding item through a user interface of the client device based on the item category associated with the corresponding item and a user segment associated with the user, wherein the user segment associated with the user is based on historical order data describing the set of orders received from the user;

computing a boosting hyperparameter for the second machine learning model, wherein the boosting hyperparameter is a hyperparameter for the second machine learning model for boosting the initial score for the corresponding item, wherein computing the boosting hyperparameter comprises:

applying the second machine learning model to order data associated with the user using a first candidate boosting hyperparameter of a plurality of candidate boosting hyperparameters;

measuring a performance of the second machine learning model using the first candidate boosting hyperparameter; and adjusting the first candidate boosting hyperparameter to another boosting hyperparameter based on the measured performance of the second machine learning model; and boosting the initial score for the corresponding item to generate a boosted score based on the boosting hyperparameter, the item category associated with the corresponding item, and the user segment associated with the user, wherein the user segment associated with the user is based at least in part on the historical order data describing the set of orders received from the user;

ranking the set of items based at least in part on the boosted score for each item;

sending the ranking to the client device associated with the user which causes the client device to generate a user interface in a display area of the client device by:

generating a plurality of user interface elements that each correspond to one item from the set of items, each user interface element for accessing computer functionality of the client device responsive to a selection of the user interface element by the user;

arranging the plurality of user interface elements according to the ranking sent to the client device that is based at least in part on the boosted score for each item from the set of items; and displaying the plurality of user interface elements that are arranged according to the ranking in the user interface; and receiving, from the client device, a selection of one of the plurality of user interface elements that is displayed in the user interface, wherein the computer functionality of the client device that corresponds to the one of the plurality of user interface elements is accessed responsive to receiving the selection.

2. The method of claim 1, wherein the boosting hyperparameter for boosting the initial score for the corresponding item is further determined based on the historical order data describing the set of orders received from the user.

3. The method of claim 1, wherein the boosting hyperparameter changes an expected value associated with the corresponding item and the boosting hyperparameter is selected from a group consisting of: a coefficient and an exponent.

4. The method of claim 3, wherein the expected value, associated with the corresponding item is based at least in part on the boosting hyperparameter a measure of relevance of the corresponding item to the search query, and a price associated with the corresponding item.

5. The method of claim 1, wherein the item category associated with the corresponding item is selected from a group consisting of: groceries, alcohol, tobacco, pharmaceuticals, gifts, clothing, accessories, personal care, books, electronics, furniture, houseware, toys, sporting goods, pet supplies, baby supplies, arts and crafts supplies, office supplies, party supplies, cleaning supplies, home improvement, and appliances.

6. The method of claim 1, wherein the user segment associated with the user is selected from a group consisting of: a value-oriented user segment and a premium user segment.

7. The method of claim 6, wherein the user segment associated with the user is determined based at least in part on one or more features associated with the user selected from a group consisting of: an average total amount spent on each order of the set of orders received from the user, an average percentage of discounted items included in each order of the set of orders received from the user, an average amount spent on each item included in each order of the set of orders received from the user, an average number of items associated with at least a threshold price included in each order of the set of orders received from the user, an average number of items associated with less than a threshold price included in each order of the set of orders received from the user, an average number of organic items included in each order of the set of orders received from the user, a frequency with which the user placed one or more orders included among the set of orders, and one or more retailer types associated with the set of orders received from the user.

8. The method of claim 7, further comprising:

generating a plurality of data points associated with a plurality of users of the online system, wherein a data point is generated based at least in part on the one or more features associated with a corresponding user of the online system;

classifying each of the plurality of data points into a user segment of a plurality of user segments based at least in part on a clustering algorithm; and determining the user segment associated with the user based at least in part on a classification of a data point associated with the user.

9. A computer program product comprising a non-transitory computer readable storage medium having instructions encoded thereon that, when executed by a processor, cause the processor to:

receive a search query from a client device associated with a user of an online system;

query a database comprising item data for a set of items that match at least a portion of the search query, wherein the set of items is included among an inventory of a retailer location, the retailer location is associated with a retailer type, and each item of the set of items is associated with an item category;

for each item of the set of items:

computing an initial score for a corresponding item by applying a first machine learning model to a set of attributes of the user and an additional set of attributes of a corresponding item to predict a probability of the user interacting with the corresponding item through a user interface of the client device, wherein the first machine model comprises a neural network;

train a second machine learning model for the item of the corresponding items, wherein the second machine learning model comprises a regression model, wherein the second machine learning model is trained to predict the probability of the user interacting with the corresponding item through a user interface of the client device based on the item category associated with the corresponding item and a user segment associated with the user, wherein the user segment associated with the user is based on historical order data describing the set of orders received from the user;

compute a boosting hyperparameter for the second machine learning model, wherein the boosting hyperparameter is a hyperparameter for the second machine learning model for boosting the initial score for the corresponding item, wherein computing the boosting hyperparameter comprises;

applying the second machine learning model to order data associated with the user using a first candidate boosting hyperparameter of a plurality of candidate boosting hyperparameters;

measuring a performance of the second machine learning model using the first candidate boosting hyperparameter; and adjusting the first candidate boosting hyperparameter to another boosting hyperparameter based on the measured performance of the second machine learning model; and boost the initial score for the corresponding item to generate a boosted score based on the boosting hyperparameter the item category associated with the corresponding item, and the user segment associated with the user, wherein the user segment associated with the user is based at least in part on the historical order data describing the set of orders received from the user;

rank the set of items based at least in part on the boosted score for each item;

send the ranking to the client device associated with the user which causes the client device to generate a user interface in a display area of the client device by:

generating a plurality of user interface elements that each correspond to one item from the set of items, each user interface element for accessing computer functionality of the client device responsive to a selection of the user interface element by the user;

arranging the plurality of user interface elements according to the ranking sent to the client device that is based at least in part on the boosted score for each item from the set of items; and displaying the plurality of user interface elements that are arranged according to the ranking in the user interface; and receive, from the client device, a selection of one of the plurality of user interface elements that is displayed in the user interface, wherein the computer functionality of the client device that corresponds to the one of the plurality of user interface elements is accessed responsive to receiving the selection.

10. The computer program product of claim 9, wherein the boosting hyperparameter for boosting the initial score for the corresponding item is further determined based on the historical order data describing the set of orders received from the user.

11. The computer program product of claim 9, wherein the boosting hyperparameter changes an expected value associated with the corresponding item and the boosting hyperparameter is selected from a group consisting of: a coefficient and an exponent.

12. The computer program product of claim 11, wherein the expected value associated with the corresponding item is based at least in part on the boosting hyperparameter, a measure of relevance of the corresponding item to the search query, and a price associated with the corresponding item.

13. The computer program product of claim 9, wherein the item category associated with the corresponding item is selected from a group consisting of: groceries, alcohol, tobacco, pharmaceuticals, gifts, clothing, accessories, personal care, books, electronics, furniture, houseware, toys, sporting goods, pet supplies, baby supplies, arts and crafts supplies, office supplies, party supplies, cleaning supplies, home improvement, and appliances.

14. The computer program product of claim 9, wherein the retailer type associated with the retailer location is selected from a group consisting of: traditional grocery store, organic grocery store, convenience store, warehouse club store, specialty store, department store, discount store, premium store, and outlet store.

15. The computer program product of claim 9, wherein the user segment associated with the user is selected from a group consisting of: a value-oriented user segment and a premium user segment.

16. The computer program product of claim 15, wherein the user segment associated with the user is determined based at least in part on one or more features associated with the user selected from a group consisting of: an average total amount spent on each order of the set of orders received from the user, an average percentage of discounted items included in each order of the set of orders received from the user, an average amount spent on each item included in each order of the set of orders received from the user, an average number of items associated with at least a threshold price included in each order of the set of orders received from the user, an average number of items associated with less than a threshold price included in each order of the set of orders received from the user, an average number of organic items included in each order of the set of orders received from the user, a frequency with which the user placed one or more orders included among the set of orders, and one or more retailer types associated with the set of orders received from the user.

17. A computer system comprising:

a processor;

and a non-transitory computer readable storage medium storing instructions that, when executed by the processor, perform actions comprising:

receiving a search query from a client device associated with a user of an online system;

querying a database comprising item data for a set of items that match at least a portion of the search query, wherein each item of the set of items is associated with an item category;

for each item of the set of items:

computing an initial score for a corresponding item by applying a first machine learning model to a set of attributes of the user and an additional set of attributes of a corresponding item to predict a probability of the user interacting with the corresponding item through a user interface of the client device, wherein the first machine model comprises a neural network;

training a second machine learning model for the item of the corresponding items, wherein the second machine learning model comprises a regression model, wherein the second machine learning model is trained to predict the probability of the user interacting with the corresponding item through a user interface of the client device based on the item category associated with the corresponding item and a user segment associated with the user, wherein the user segment associated with the user is based on historical order data describing the set of orders received from the user;

computing a boosting hyperparameter for the second machine learning model, wherein the boosting hyperparameter is a hyperparameter for the second machine learning model for boosting the initial score for the corresponding item, wherein computing the boosting hyperparameter comprises:

applying the second machine learning model to order data associated with the user using a first candidate boosting hyperparameter of a plurality of candidate boosting hyperparameters;

measuring a performance of the second machine learning model using the first candidate boosting hyperparameter; and adjusting the first candidate boosting hyperparameter to another boosting hyperparameter based on the measured performance of the second machine learning model; and boosting the initial score for the corresponding item to generate a boosted score based on the boosting hyperparameter, the item category associated with the corresponding item, and the user segment associated with the user, wherein the user segment associated with the user is based at least in part on the historical order data describing the set of orders received from the user;

ranking the set of items based at least in part on the boosted score for each item;

sending the ranking to the client device associated with the user which causes the client device to generate a user interface in a display area of the client device by:

generating a plurality of user interface elements that each correspond to one item from the set of items, each user interface element for accessing computer functionality of the client device responsive to a selection of the user interface element by the user;

arranging the plurality of user interface elements according to the ranking sent to the client device that is based at least in part on the boosted score for each item from the set of items; and displaying the plurality of user interface elements that are arranged according to the ranking in the user interface; and receiving, from the client device, a selection of one of the plurality of user interface elements that is displayed in the user interface, wherein the computer functionality of the client device that corresponds to the one of the plurality of user interface elements is accessed.

* * * * *